(12) United States Patent
Akiyama

(10) Patent No.: US 6,853,896 B2
(45) Date of Patent: Feb. 8, 2005

(54) VEHICLE AGENT SYSTEM ACTING FOR DRIVER IN CONTROLLING IN-VEHICLE DEVICES

(75) Inventor: Susumu Akiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/374,083

(22) Filed: Feb. 27, 2003

(65) Prior Publication Data
US 2003/0167112 A1 Sep. 4, 2003

(30) Foreign Application Priority Data

Mar. 1, 2002 (JP) ........................................ 2002-055955

(51) Int. Cl.[7] ................................................ G06F 7/00
(52) U.S. Cl. .......................... 701/36; 701/33; 340/439; 340/5.51
(58) Field of Search ................................ 701/1, 32, 33, 701/36, 59; 340/5.51, 5.81, 5.8, 426.11, 439

(56) References Cited

U.S. PATENT DOCUMENTS

| 5,757,268 | A | * | 5/1998 | Toffolo et al. .............. 340/461 |
| 5,821,935 | A | * | 10/1998 | Hartman et al. ............. 345/839 |
| 6,009,355 | A | * | 12/1999 | Obradovich et al. ............ 701/1 |
| 6,240,347 | B1 | * | 5/2001 | Everhart et al. ............... 701/36 |
| 6,300,939 | B1 | * | 10/2001 | Decker et al. .............. 345/157 |
| 6,401,029 | B1 | | 6/2002 | Kubota et al. | |
| 6,437,689 | B2 | | 8/2002 | Kawai et al. | |

FOREIGN PATENT DOCUMENTS

JP    A-S57-138410    8/1982

* cited by examiner

Primary Examiner—Gertrude A. Jeanglaude
(74) Attorney, Agent, or Firm—Posz & Bethards, PLC

(57) ABSTRACT

A vehicle agent system controls operation of relevant in-vehicle devices as execution of a practical response for acting for a driver. When a command is inputted by the driver or a notification is inputted from an in-vehicle network, an assumed response is selected from driver information stored in a RAM, based on the command or the notification. The selected assumed response including parameters is presented to the driver. When the driver inputs a command for permitting the selected assumed response or the driver inputs no command for a predetermined period, the selected assumed response is determined to be the practice response. When the driver inputs modification, the selected assumed response is modified into the practical response.

26 Claims, 5 Drawing Sheets

FIG. 2

TBS

| CONDITION | | RESPONSE | HISTORY | POINTER | ROW |
|---|---|---|---|---|---|
| STATE | COMMAND/ NOTIFICATION | | | | |
| AUTO CRUISE NOT SET | SET | SET AUTO CRUISE | — | &XXXXX | A1 |
| AUTO CRUISE SET | RELEASE | RELEASE AUTO CRUISE | — | — | A2 |
| | BRAKE | RELEASE | XX | — | A3 |
| | | CONTINUE | XX | — | A4 |
| | | MODIFY | XX | &YYYYY | A5 |
| CAR AHEAD | AUTO BRAKE | CONTINUE | XX | — | A6 |
| | | MODIFY | XX | &YYYYY | A7 |
| | CAR AHEAD LANE MODIFIED | KEEP LANE | XX | — | A8 |
| | | MODIFY LANE | XX | — | A9 |
| | ... | ... | ... | ... | ... |
| NO CAR AHEAD | ... | ... | ... | ... | ... |
| ... | ... | ... | ... | ... | ... |

FIG. 3

| INDEX (POINTER) | PARAMETER | | HISTORY | ROW |
|---|---|---|---|---|
| AUTO CRUISE SET (&XXXXX) | MAX SPEED (NO FOLLOW-UP) | VA1 | XX | B1 |
| | | VA2 | XX | B2 |
| | | ... | ... | B3 |
| | MAX SPEED (FOLLOW-UP) | VB1 | XX | B4 |
| | | VB2 | XX | B5 |
| | | ... | ... | B6 |
| | FOLLOWING DISTANCE | D1 | XX | B7 |
| | | D2 | XX | B8 |
| | | ... | ... | ... |
| | ... | ... | ... | ... |
| AUTO CRUISE MODIFY (&YYYYY) | MAX SPEED (Δ) | ΔV1 | XX | ... |
| | | ΔV2 | XX | ... |
| | | ... | ... | ... |
| | ... | ... | ... | ... |
| ... | ... | ... | ... | ... |

TBP

VEHICLE AGENT SYSTEM ACTING FOR DRIVER IN CONTROLLING IN-VEHICLE DEVICES

CROSS REFERENCE TO RELATED APPLICATIONS

This application is based on and incorporates herein by reference Japanese Patent Application No. 2002-55955 filed on Mar. 1, 2002.

FIELD OF THE INVENTION

The present invention relates to a vehicle agent system of acting for a driver of a vehicle in controlling in-vehicle devices.

BACKGROUND OF THE INVENTION

Drive assisting devices mounted in a vehicle are developed for relieving a workload of a driver, escaping a traffic accident, or providing a preventive operation. The drive assisting devices include an adaptive cruise control, a lane keeping system, a night vision system, and a parking aid system.

The drive assisting devices involve setting of parameters in practical use. At appropriate predetermined setting, they can be effective and efficient in automatically functioning for obtaining necessary information or controlling in-vehicle devices.

The setting of the drive assisting devices must be therefore modified by the driver's judgment each time when condition changes. Here, although the driver needs to turn on or off the functioning, or execute the setting of the parameters, these operations required to the driver are burdensome for the driver and sometimes forgotten at appropriate timing for operation by the driver. Hence the drive assisting devices cannot be always utilized satisfactorily.

When the vehicle is equipped with various kinds of the drive assisting devices, the driver may not be concentrated on driving by being forced to operate the drive assisting devices. Harsher situation for driving in a highway, heavy traffic, or bad weather leads the driver to be stressed and tired with the above operations during the driving.

SUMMARY OF THE INVENTION

It is an object of the present invention to provide a vehicle agent system acting for a driver, with relieving driver's operations, in controlling in-vehicle devices.

To achieve the above object, an agent system acting for a driver of a vehicle is provided with the following. The agent system stores a plurality of assumption responses to be probably operated by a driver according to either of a predetermined command and a predetermined state. The agent system selects one of the assumption responses according to a predetermined command or a predetermined state when the command is inputted by the driver or changes in states of the in-vehicle devices and surroundings of the vehicle. The agent system determines a practice response based on the inputted command of the driver to the selected assumption response to control the in-vehicle devices based on the practice response.

The above structure of the agent system enables driver's operation to be drastically relieved in controlling the in-vehicle devices due to the state changes. Automatic selection of the response enables the driver to operate only when the presented response should be modified. This also enables necessary operation to be securely executed even when the driver forgets to execute it. The above agent system thus provides the driver with safe and comfortable driving.

BRIEF DESCRIPTION OF THE DRAWINGS

The above and other objects, features and advantages of the present invention will become more apparent from the following detailed description made with reference to the accompanying drawings. In the drawings:

FIG. 2 is a response selecting table for listing assumption response according to the embodiment;

FIG. 3 is a parameter table for listing parameters according to the embodiment;

DETAILED DESCRIPTION OF THE PREFERRED EMBODIMENTS

Figure 1:
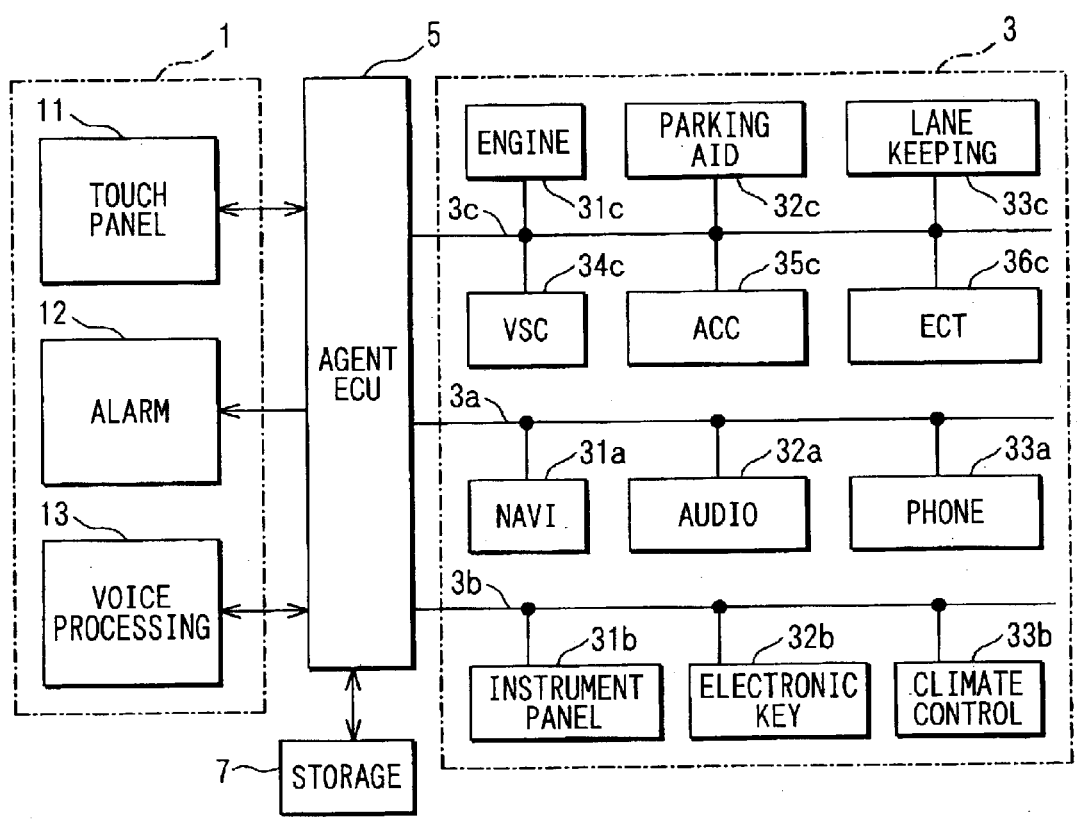
FIG. 1 is an overall structural block diagram of a vehicle agent system according to an embodiment of the present invention.

Referring to FIG. 1, an in-vehicle system to which the present invention is applied includes a section of human machine interfaces (HMI) 1, in-vehicle local area networks (in-vehicle LANs) 3, a storage unit 7, and an agent electronic control unit (agent ECU) 5.

The HMI 1 includes a touch panel 11 for displaying and inputting, an alarm unit 12 having a speaker for outputting an alarming sound, and a voice processing unit 13 having a microphone and a speaker for recognizing an inputted voice and synthesizing an outputted voice.

A driver can input a command through vocalizing using the voice processing unit 13 or through touching using the touch panel 11. The driver can be provided with information through images displayed on the touch panel 11 or through voice or sound outputted from the voice processing unit 13 or the alarm unit 12.

The in-vehicle LANs 3 include a LAN for communicating with audio, visual, and communication devices (AVC LAN 3a), a LAN for communicating with devices for controlling a vehicle body (body control LAN 3b), and a LAN for communicating with devices for controlling vehicle travel (travel control LAN 3c).

The devices communicated by the AVC LAN 3a include a navigation ECU (electronic control unit) 31a for processing a navigation system, an audio device 32a having a CD player, a phone unit 33a having a cell phone.

The devices communicated by the body control LAN 3b include an instrument panel ECU 31b, an electronic key ECU 32b, and a climate control ECU 33b. The instrument panel ECU 31b is for processing of displaying to instrument panel digital values of vehicle speed, engine rotation speed, and a fuel amount. The electronic key ECU 32b is for processing of authentication for preventing robbery. The climate control ECU 33b is for controlling an air-conditioner for the interior of the vehicle.

The devices communicated by the travel control LAN 3c include an engine ECU 31c, a parking aid ECU 32c, a lane keeping ECU 33c, a vehicle stability control ECU (VSC ECU) 34c, an adaptive cruise control ECU (ACC ECU) 35c, and an electric controlled transmission ECU (ECT ECU) 36c. The engine ECU 31c is for controlling a fuel injection amount, ignition timing, and others. The parking aid ECU 32c is for supervising a state of the exterior of the vehicle using an image recognition unit or a radar unit. The lane keeping ECU 33c is for controlling of autonomous travel by recognizing a lane marker on a road. The VSC ECU 34c is for controlling of stabilization of vehicle position when sharp turn is made in such as a frozen road. The ACC ECU 35c is for controlling of automatic cruising. The ECT ECU 36c is for controlling of automatic transmission shift.

These three types of the in-vehicle LANs 3a to 3c are communicated mutually by being intermediated by the agent ECU 5 having a gateway function.

The storage unit 7 is for storing driver information to be explained later. The driver information includes each set of a response selecting table TBS and a parameter table TBP, pertinent to a previously registered driver.

Referring to FIG. 2, in the response selecting table TBS, assumption response is stored according to a condition that combines a previously set state and a command by the driver or notification. The notification is transmitted from the in-vehicle devices 31a to 33a, 31b to 33b, 31c to 36c through the in-vehicle LANs 3. The assumption response means one or more assumed responses that are to be probably operated by the driver according to the condition.

The response selecting table TBS also includes, in each response, history information that indicates how frequent the response has been selected when a certain condition corresponds to a plurality of responses, e.g., as shown in ROWs A3, A4, A5 in FIG. 2. Furthermore, when the response involves parameters in its execution, the response has a pointer (e.g., in ROWs A1, A5, A7 in FIG. 2) that corresponds to a parameter in the parameter table TBP shown in FIG. 3.

In the parameter table TBP, the pointer (index) includes several group-parameters such as "MAX SPEED (NO FOLLOW-UP)," "MAX SPEED (FOLLOW-UP)," and "FOLLOWING DISTANCE." Each sub-parameter furthermore includes parameters. Each parameter written in each ROW has a value and history information indicating how frequent the parameter has been selected.

The agent ECU 5 is for executing various controls of the in-vehicle devices and providing the driver with various pieces of information, by controlling the HMI 1 and the in-vehicle devices 31a to 33a, 31b to 33b, 31c to 36c through the in-vehicle LANs 3.

The agent ECU 5 is formed mainly of a known microcomputer having a CPU, a ROM, and a RAM, and equipped with a communication circuit for communicating through the in-vehicle LANs 3 and an input/output (I/O) circuit for inputting or outputting data with the HMI 1 or the storage unit 7.

Figure 4:
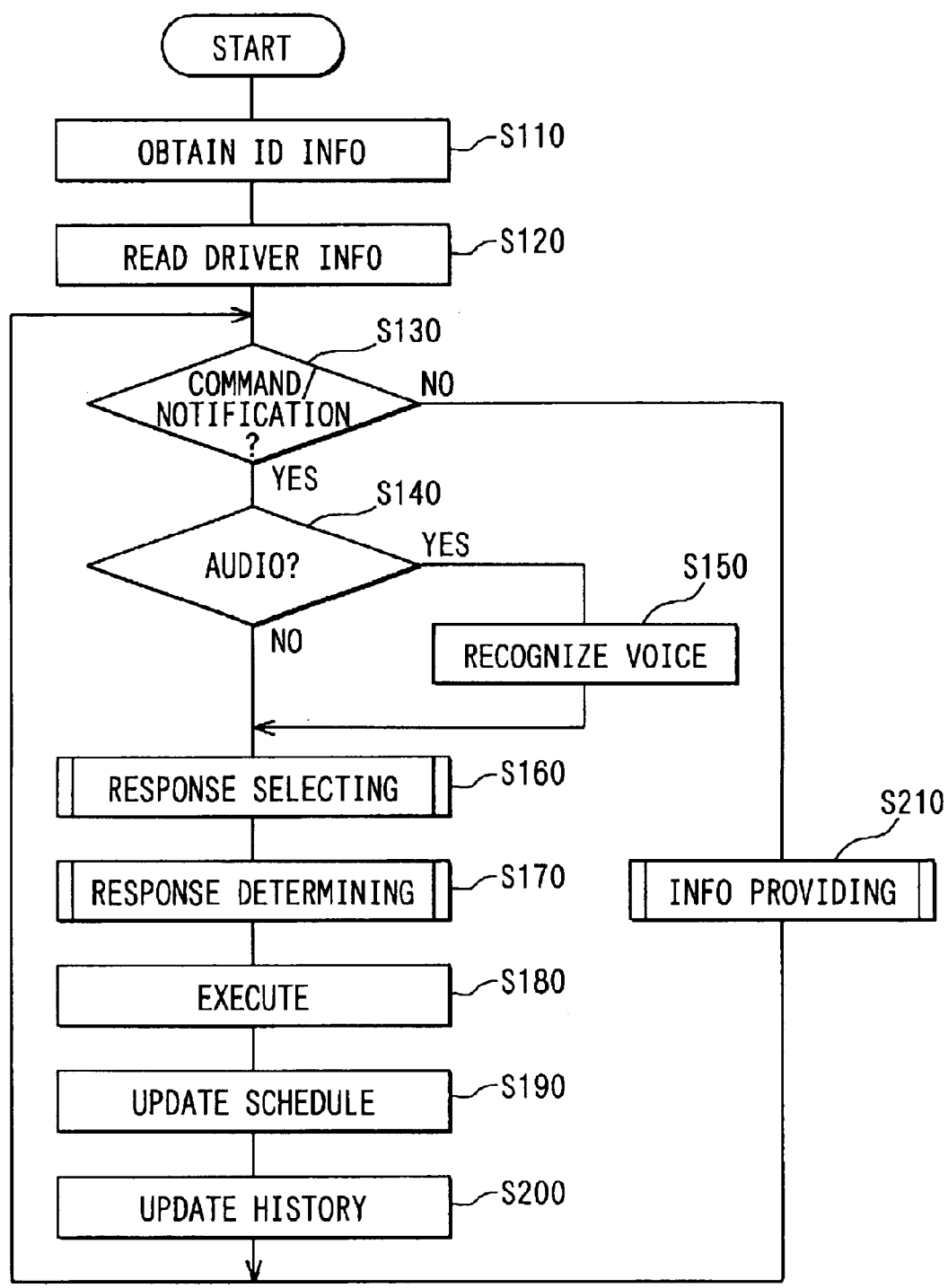
FIG. 4 is a flowchart diagram explaining processing executed by an agent electronic control unit according to the embodiment.

Referring to FIG. 4, processing executed by the agent ECU 5 will be explained below.

At Step 110, identification information stored in the electronic key is obtained from the electronic key ECU 32b.

At Step 120, driver information corresponding to the identification information is read out from the storage unit 7 and stored in the RAM of the agent ECU 5 itself.

At Step 130, whether a command from the driver through the HMI 1 or notification from the in-vehicle devices through the in-vehicle LANs 3 is inputted is determined. When the command or the notification is determined to be inputted, the processing proceeds to Step 140.

At Step 140, whether the command is inputted through the vocalizing is determined. When the command is determined to be inputted through the vocalizing, the processing proceeds to Step 150, where the command through the vocalizing is interpreted based on result recognized by the voice processing unit 13. When the command is determined to be inputted not through the vocalizing or the processing at Step 150 is completed, the processing proceeds to Step 160.

At Step 160, response selecting processing for selecting the assumption response that is to be probably operated by the driver is executed based on the command from the driver or the notification from the in-vehicle devices 31a to 33a, 31b to 33b, 31c to 36c.

Figure 5:
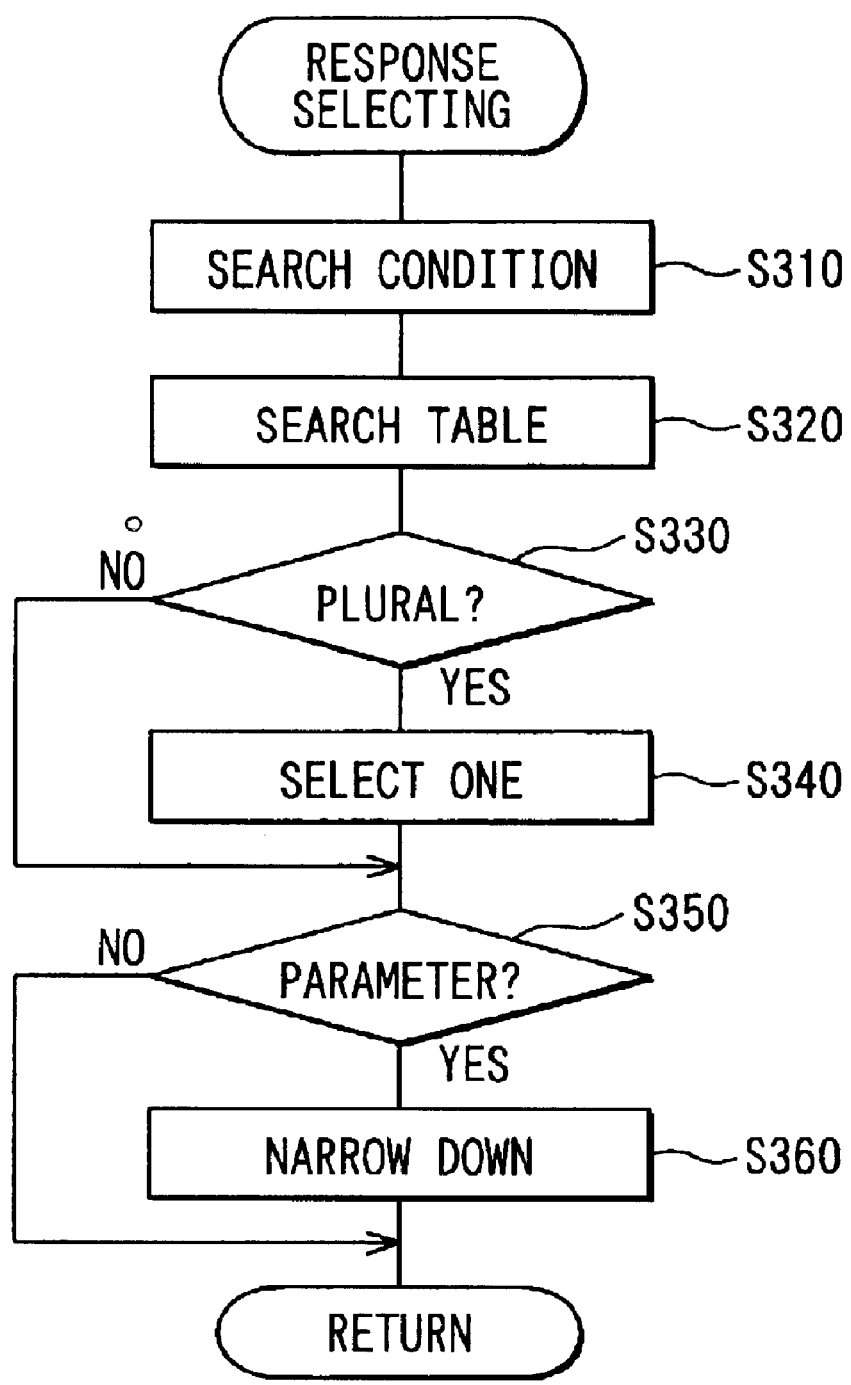
FIG. 5 is a flowchart diagram explaining processing for response selecting according to the embodiment.

Referring to FIG. 5, details of the response selecting processing will be explained.

At Step 310, a current state is associated to a relevant condition stored in the response selecting table TBS based on the command from the driver or notification from the in-vehicle devices 31a to 33a, 31b to 33b, 31c to 36c.

At Step 320, the response selection table TBS is searched to read relevant assumption response based on the relevant condition.

At Step 330, whether the relevant assumption response pertinent to the relevant condition includes one or more than one is determined. When more than one response is included, the processing proceeds to Step 340, where one assumption response is selected from more than one response based on the history information. Here, the most frequently selected response or the most recently selected response can be selected. When only one response is included or the processing at Step 340 is completed, the processing proceeds to Step 350.

At Step 350, whether parameter setting is necessary is determined by checking presence of the pointer in the response selecting table TBS. When the parameter setting is determined to be necessary (the pointer is registered), the processing proceeds to Step 360.

At Step 360, a set of parameters relating to the pointer (shown in FIG. 3) is narrowed down based on the history information. When the parameter setting is determined to be not necessary (the pointer is not registered) at Step 350 or the processing at Step 360 is completed, the response selecting processing is terminated.

Thus the response selecting processing enables one assumption response to be selected together with one set of the parameters if the parameters are registered.

Returning to FIG. 4, at Step 170 response determining processing is executed based on the assumption response and the relevant set of the parameters if they are existing. In the response determining processing, the selected assumption response with the set of the parameters is presented to the driver through the HMI 1. When the driver inputs a command for permitting the presented assumption response or the driver does not input any command for a predetermined period, the presented assumption response is determined to be practice response that is to be executed practically. When the driver inputs modification to the presented assumption response or the set of the parameters, the modified response is determined to be the practice response.

At Step 180, controls based on the practice response are executed in the relevant in-vehicle devices 31a to 33a, 31b to 33b, 31c to 36c.

At Step 190, when there is information that should be provided to the driver as providing information regarding the practical response determined at Step 170, content and providing timing of this providing information are registered in a schedule table (not shown). Here, the providing information has an ordering of priority. If the ordering of the priority of this providing information needs to be modified based on current travel condition or travel environment, it is modified at Step 190.

At Step 200, the history information is updated in the response selecting table TBS and parameter table TBP based on the practice response determined at Step 170. This enables the driver's preference to be reflected into the driver information, which results in decreasing frequency of driver's rejection or modification. As a result, driver's workload decreases with increasing usage period of the system. When the processing at Step 200 is completed, the processing returns to Step 130.

Returning to Step 130, when the command from the driver or the notification from the in-vehicle devices 31a to 33a, 31b to 33b, 31c to 36c is determined to be not inputted, the processing proceeds to Step 210.

At Step 210, information providing processing is executed for providing the driver with the providing information registered in the schedule table. When the processing at Step 210 is completed, the processing returns to Step 130.

In the information providing processing, a certain piece of providing information that is necessary for the driver as of that moment is extracted from the plurality of the pieces of the providing information registered in the schedule table. The certain information is provided to the driver through the HMI 1. When more than one pieces of the information are extracted, they are provided in order according to the ordering of the priority. The ordering of the priority is assigned depending on the content of the providing information. For instance, from the highest priority to the lowest priority, emergency notice, drive assisting information, route guidance, maintenance information, and entertainment information are provided in order.

A specific instance of the embodiment will be explained below, again referring to FIGS. 2 and 3. When the driver inputs a command for setting of the automatic cruising while the automatic cruising is not set, the agent ECU 5 searches the response selecting table TBS for a relevant condition and selects ROW A1. Since ROW A1 has a registered pointer (&xxxxx), the agent ECU 5 reaches the parameter table TBP for the registered pointer (&xxxxx). The agent ECU 5 then presents to the driver the parameters selected from the index (&xxxxx) with considering the history information. Only one parameter value is selected for each group-parameter of "MAX SPEED (NO FOLLOW-UP)," "MAX SPEED (FOLLOW-UP)," "FOLLOWING DISTANCE," and others. When the presented parameters are acceptable for the driver, the driver inputs a command for confirmation or nothing. When the presented parameters need modification, the modification is inputted by the driver through the HMI 1 to enable the setting of the automatic cruising to be modified.

When applying of a brake by the driver is detected after the automatic cruising is set, the agent ECU 5 selects to present to the driver, considering the history information, the highest frequent assumption response from "SETTING RELEASE," "SETTING CONTINUE," or "SETTING MODIFY" (ROWs A3, A4, A5) in the response selecting table TBS. If the selected assumption response has the registered pointer, the parameters corresponding to the registered pointer are also presented as explained above. The driver needs to input a command only when the presented response or parameters need modification.

When the automatic cruising is set, the agent ECU 5 presents an assumption response in each case according to a condition such that a vehicle runs ahead, that the brake is automatically controlled, or that a vehicle ahead enters the next lane.

Furthermore, for instance, during the lane keeping control and following-up control, when the parking aid ECU 32c notifies detection that a vehicle running in the adjacent lane has abnormally approached, the agent ECU 5 executes as follows. With outputting the alarming sound, the agent ECU 5 selects to execute release of the lane keeping control and the following-up control without presenting to the driver. After avoiding the danger, the agent ECU 5 inquires to the driver whether the lane keeping control and the following-up control should be again set. This processing can be installed into the response selecting table TBS.

During the lane keeping control with keeping a constant low speed, when a registered vehicle, e.g., a vehicle of a friend, is confirmed to be approaching within a predetermined distance through communication between vehicles, the confirmed information can be presented to the driver. This processing can be set as the providing information in the schedule table.

As explained above, various responses can be practical according to the content of the response selecting table TBS, the parameter table TBP, or the providing information registered in the schedule table.

(Modification)

In the response selecting processing of the embodiment, the response is selected using the response selecting table TBS. However, immediately when a destination and a planned arrival time are inputted, the automatic cruising control can be set along with selecting a route and speed to enable arriving on time. When it is assumed that heavy traffic disables arriving on time, modification of the planned arrival time or release of the following-up control can be presented to the driver as the providing information.

Although the driver information is stored in the storage unit 7, it can be stored in the electronic key of the driver. The driver information can be also stored in a server within a network outside the vehicle to be read out through wireless communication.

Furthermore, the driver information can be plurally prepared according to weather, a season, or a time range of the day, so that the driver information much appropriate to each condition is able to be selected.

What is claimed is:

1. An agent system acting for a driver of a vehicle that has a device, the agent system comprising:

command inputting means for inputting a plurality of commands from the driver;

state detecting means for detecting at least one of states of the device and surroundings of the vehicle;

information storing means for storing driver information including a plurality of assumption responses to be probably operated by the driver according to either of a predetermined command and a predetermined state;

response selecting means for selecting, either of when a given command is inputted by the driver and when the state detected by the state detecting means changes, a given assumption response from the plurality of the assumption responses stored in the information storing means, based on either of the given command inputted from the driver and the change of the state;

response determining means for determining, after the given assumption response selected by the response selecting means is presented to the driver, a practice response based on the given assumption response and a certain command that is inputted from the driver and relates to the presented given assumption response;

controlling means for controlling the device based on the practice response determined by the response determining means; and information providing means for providing the driver with at least one of a plurality of pieces of provision information based on the practice response determined by the response determining means, according to an ordering of priority, wherein the ordering of priority is assigned depending on contents of the plurality of pieces of provision information.

2. An agent system according to claim 1, further comprising:

information modifying means for modifying the driver information stored in the information storing means based on the practice response determined by the response determining means.

3. An agent system according to claim 1, further comprising:

information installing means for installing to the information storing means the driver information read out from a predetermined information source.

4. An agent system according to claim 3, wherein the predetermined information source includes an electronic key that stores the driver information.

5. An agent system according to claim 3, further comprising:

driver identifying means for identifying the driver, wherein the information installing means reads out from the predetermined information source the driver information that corresponds to the driver identified by the driver identifying means.

6. An agent system according to claim 5, wherein the driver identifying means identifies the driver based on identification information read out from an electronic key.

7. An agent system according to claim 5, wherein the predetermined information source is included in a server located in a network outside of the vehicle, and wherein the information installing means accesses the server via a wireless communication line.

8. An agent system according to claim 3, wherein the information installing means changes the driver information read out from the predetermined information source according to the state detected by the state detecting means.

9. An agent system according to claim 1, wherein, the ordering of priority is individually assigned to each piece of the provision information.

10. An agent system according to claim 9, wherein the information providing means changes the ordering of the priority of each piece of the provision information according to the state detected by the state detecting means.

11. An agent system according to claim 9, wherein the provision information relating to controlling travel of the vehicle is given top priority.

12. An agent system according to claim 1, wherein communication among the command inputting means, state detecting means, the information storing means, the response selecting means, the response determining means, and the controlling means is executed by using at least a communication network in the vehicle.

13. An electronic control unit acting for a driver of a vehicle that has a device and a plurality of communication networks, the electronic control unit comprising:

command inputting means for inputting a plurality of commands from the driver;

state detecting means for detecting at least one of states of the device and surroundings of the vehicle;

information storing means for storing driver information including a plurality of assumption responses to be probably operated by the driver according to either of a predetermined command and a predetermined state;

response selecting means for selecting, either of when a given command is inputted by the driver and when the state detected by the state detecting means changes, a given assumption response from the plurality of the assumption responses stored in the information storing means, based on either of the given command inputted from the driver and the change of the state;

response determining means for determining, after the given assumption response selected by the response selecting means is presented to the driver, a practice response based on the given assumption response and a certain command that is inputted from the driver and relates to the presented given assumption response;

controlling means for controlling the device based on the practice response determined by the response determining means;

information providing means for providing the driver with at least one of a plurality of pieces of provision information based on the practical response determined by the response determining means, according to an ordering of priority, wherein the ordering of priority is assigned depending on contents of the plurality of pieces of provision information; and gateway means for interconnecting the plurality of the networks.

14. A method for acting for a driver of a vehicle that has a device, the method comprising steps of:

inputting a plurality of commands from the driver;

detecting at least one of states of the device and surroundings of the vehicle;

storing driver information including a plurality of assumption responses to be probably operated by the driver according to either of a predetermined command and a predetermined state;

selecting, either of when a given command is inputted by the driver and when the detected state changes, a given assumption response from the plurality of the stored assumption responses, based on either of the given command inputted from the driver and the change of the state;

determining, after the selected given assumption response is presented to the driver, a practice response based on the given assumption response and a certain command that is inputted from the driver and relates to the presented given assumption response;

controlling the device based on the determined practice response; and providing the driver with at least one of a plurality of pieces of provision information based on the practical response, according to an ordering of priority, wherein the ordering of priority is assigned depending on contents of the plurality of pieces of provision information.

15. An agent system according to claim 1,
wherein the contents include at least three of warning notice, travel control, and another.

16. An agent system according to claim 1,
wherein the information providing means changes the ordering of the priority according to the state detected by the state detecting means.

17. An agent system according to claim 1,
wherein, of the provision information, the content relating to travel control of the vehicle is given top priority.

18. An agent system according to claim 17,
wherein the travel control includes at least one of engine control, lane keeping control, vehicle stability control, adaptive cruise control, and electric controlled transmission control.

19. An agent system according to claim 1,
wherein the detecting means detects the states of surroundings of the vehicle using at least one of an image recognition unit and a radar unit.

20. An agent system acting for a driver of a vehicle that has a device, the agent system comprising:
command inputting means for inputting a plurality of commands from the driver;
state detecting means for detecting at least one of states of the device and surroundings of the vehicle;
information storing means for storing driver information including a plurality of assumption responses to be probably operated by the driver according to either of a predetermined command and a predetermined state;
response selecting means for selecting, either of when a given command is inputted by the driver and when the state detected by the state detecting means changes, a given assumption response from the plurality of the assumption responses stored in the information storing means, based on either of the given command inputted from the driver and the change of the state;
response determining means for determining, after the given assumption response selected by the response selecting means is presented to the driver, a practice response based on the given assumption response and a certain command that is inputted from the driver and relates to the presented given assumption response; and
controlling means for controlling the device based on the practice response determined by the response determining means,
wherein a state detected by the state detecting means is classified into one of a first state that requires warning notice and a second state that does not require the warning notice, and
wherein, when the controlling by the controlling means corresponds to the first state that requires the warning notice, the controlling corresponding to the first state is given a higher priority.

21. An agent system according to claim 20,
wherein, when a state detected by the state detecting means is classified into the first state,
the response selecting means selects an assumption response from the plurality of the assumption responses based on the state that is detected by the state detecting means and classified into the first state,
the response determining means determines, without presenting to the driver the assumption response selected by the response selecting means, a practice response based on the assumption response selected by the response selecting means, and
the controlling means executes the controlling of the device, based on the practice response determined by the response determining means and the higher priority that is given to the controlling.

22. An agent system according to claim 1, further comprising:
an adaptive cruise control unit for controlling of automatic cruising,
wherein the state detecting means supervises a state of an exterior of the vehicle to detect at least a following distance to another vehicle ahead of the vehicle,
wherein the information storing means stores driver information that is used when the adaptive cruise control unit is activated and includes parameters at least including one of a maximum speed and a following distance with corresponding history information, and
wherein the response selecting means presents an assumption response to the driver based on a highest frequency in the history information.

23. An agent system according to claim 1, further comprising:
an adaptive cruise control unit for controlling of automatic cruising,
wherein the information storing means stores driver information that is used when a brake is operated while the adaptive cruise control unit is activated, and the assumption responses include at least one of setting releasing, setting continuing, and setting modifying with corresponding history information, and
wherein the response selecting means presents an assumption response to the driver based on a highest frequency in the history information.

24. An agent system according to claim 1, further comprising:
an adaptive cruise control unit for controlling of automatic cruising,
wherein the state detecting means supervises a state of an exterior of the vehicle to detect that a vehicle running in an adjacent lane approaches, and
wherein the information storing means stores driver information including a plurality of assumption responses according to at least one of three conditions of a first condition related to whether the adaptive cruise control unit is activated, a second condition related to whether a brake is operated, and a third condition related to whether the vehicle running in an adjacent lane abnormally approaches.

25. An agent system according to claim 1, further comprising:
an adaptive cruise control unit for controlling of automatic cruising; and
a lane keeping control unit for controlling of autonomous travel by recognizing a lane marker on a road,
wherein the state detecting means supervises a state of an exterior of the vehicle to detect that a vehicle running in an adjacent lane approaches, and
wherein, when the adaptive cruise control unit and the lane keeping control unit are activated and when the state detecting means detects that a vehicle running in an adjacent lane abnormally approaches, the controlling means executes outputting an alarming sound, and selects to execute release of the lane keeping control unit and the adaptive cruise control unit without alerting the driver.

26. An agent system according to claim 1, further comprising:
   an adaptive cruise control unit for controlling of automatic cruising, and
   a lane keeping control unit for controlling of autonomous travel by recognizing a lane marker on a road,
   wherein the state detecting means detects that another vehicle approaches, and
   wherein, when the lane keeping control unit is set so that a constant low speed is kept and a registered vehicle is confirmed to be approaching within a predetermined distance, confirmed information is presented to the driver as one of the plurality of provision information.

* * * * *